Sept. 7, 1948.  F. J. DIAMANT  2,448,663
COMPOSITE SHOE PLATFORM
Filed Nov. 29, 1945
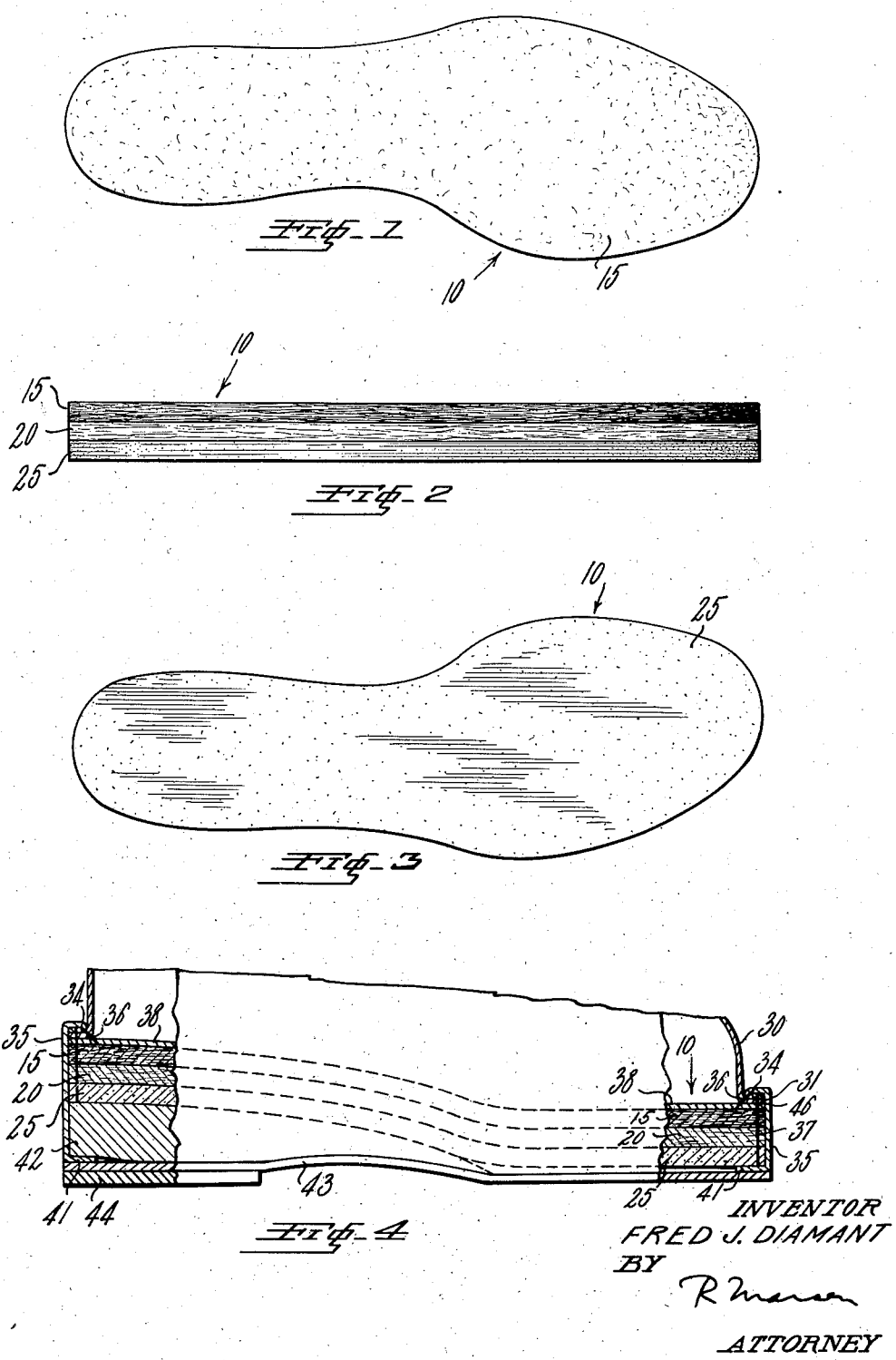
INVENTOR
FRED J. DIAMANT
BY
R. Manson
ATTORNEY Patented Sept. 7, 1948

2,448,663

UNITED STATES PATENT OFFICE 2,448,663

COMPOSITE SHOE PLATFORM

Fred J. Diamant, New York, N. Y.

Application November 29, 1945, Serial No. 631,546

1 Claim. (Cl. 36—30)

This invention relates to a composite shoe platform and more particularly to such a platform comprising inner and outer and intermediate layers of material possessing different characteristics of resiliency and dimensional stability.

It is among the objects of this invention to provide a composite platform for shoes including an upper foot engaging layer of cushioning material having a fair degree of dimensional stability, an intermediate layer of cushioning material which is substantially unstable dimensionally, and a bottom layer of relatively stiff reinforcing material secured together as a unit; to provide such a shoe platform in which the layers are secured together as a unit; to provide such a shoe platform in which the layers are secured together as a unit, preferably by adhesive, for incorporation in a shoe; to provide such a shoe platform having novel characteristics with respect to cushioning effect and resiliency; and to provide a simple, inexpensive, shoe platform having improved charactertistics over those now known to the art.

These and other objects, advantages and novel features of the invention will be apparent from the following description and the accompanying drawing.

In the drawing:

Fig. 1 is a top plan view of a shoe platform embodying the present invention.

Fig. 2 is a side elevational view thereof.

Fig. 3 is a bottom plan view thereof.

Fig. 4 is an elevation view, partly in section, illustrating the platform of Figs. 1, 2 and 3 as incorporated in a shoe.

Referring to Figs. 1, 2 and 3, the platform 10 of the present invention comprises several layers of material preferably three in number. The several layers are uniformly secured together, preferably by coatings of cement or other adhesive. However, the layers may be united into a composite unit by spot cementing, sewing, stapling or otherwise.

Upper layer 15 of the platform is formed of a material which is of medium softness, but has a fairly firm consistency providing dimensional stability. Thus, layer 15 may be a hard felt, rubberized felt, or the like. This material provides for comfortable engagement of the foot, while insuring horizontal and vertical stability of the edges of the platform when incorporated in a shoe.

Intermediate layer 20 is likewise formed of a cushioning material which, however, need not have the dimensional stability characteristics of the material comprising layer 10. Intermediate layer 20 acts as a shock absorber to the shoe providing comfort in walking and imparting resiliency to platform 10. A suitable material for layer 20 is pad felt, matted fiber, soft sponge rubber or the like.

Preferably, the peripheral edge of the intermediate felt layer 20 is coated with animal glue or the like. Such coating is preferably applied after the shape of the intermediate layer has been determined and after the layer has been incorporated in the platform construction. The glue coating stiffens the peripheral edge of the cushioning layer reinforcing the platform assembly and rendering it more stable and better able to keep its peripheral shape during handling and assembly in a shoe.

Bottom layer 25 of platform 10 is a reinforcing layer formed of relatively stiff material having a hard texture but preferably flexible. A suitable material is cardboard, fiber-board, paper-board, hard paper and so forth. Layer 25 acts as a reinforcing layer having sufficient dimensional stability to maintain platform 10 against distortion, and to provide clean, sharp edges for the platform when incorporated in a shoe.

Fig. 4 illustrates platform 10 as incorporated in a shoe. Shoe upper 30 is provided with a stitching margin 31 secured to the stitching margins 34 of platform cover 35 and 46 of insole or sock lining 38, by suitable means such as stitching 36. Stitching margins 31, 34, and 46 are secured to platform 10 by stitching 37 extending through the three layers of the platform. To complete the shoe, platform cover 35 is reversed upon itself and its lower margin 41 is turned in beneath lower layer 25 of platform 10 and beneath a heel 42 of any suitable material. Outer sole 43 is then secured to margin 41 adhesively or otherwise. A lift 44 is secured near the rear end of outer sole 43 to complete the shoe.

The resultant shoe has a layer of material at the top of the platform for comfortable engagement of the foot, and resting upon a shock absorbing intermediate layer of softer material providing comfort in walking and resiliency in the shoe. The platform is retained dimensionally stable by means of the lower reinforcing layer of hard textured, but flexible material. The platform is the equivalent of a solid platform of the same thickness formed of a single material such as soft rubber, but has advantages thereover due to its ease of construction and its inexpensiveness. If intermediate layer 20 were omitted, the platform would be stiffer than if such layer were included. Layer 15 is necessary due to the fact that shock absorbing layer 20 does not have sufficient dimensional stability to be properly incorporated into a shoe construction.

While a specific embodiment of the invention has been shown and described in detail to illustrate the application of the principles thereof, it will be understood that the invention may be otherwise embodied, without departing from such principles.

What is claimed is:

A composite shoe platform comprising an upper layer of hard felt, a lower layer of fiber board, and an intermediate layer of felt padding, united to form a composite unit.

FRED J. DIAMANT.

REFERENCES CITED

The following references are of record in the file of this patent:

UNITED STATES PATENTS

| Number | Name | Date |
| --- | --- | --- |
| Re. 4,547 | Johnson | Sept. 12, 1871 |
| 259,230 | Sprague | June 6, 1882 |
| 450,920 | Snellenburg et al. | Apr. 21, 1891 |
| 901,236 | Gordon | Oct. 13, 1908 |
| 1,443,081 | MacKintosh | Jan. 23, 1923 |
| 1,473,695 | Brown | Nov. 13, 1923 |
| 2,121,604 | Lynch et al. | June 21, 1938 |
| 2,391,564 | Gregg | Dec. 25, 1945 |

FOREIGN PATENTS

| Number | Country | Date |
| --- | --- | --- |
| 106,198 | Switzerland | Aug. 1, 1924 |
| 108,688 | Switzerland | May 1, 1925 |
| 135,727 | Switzerland | Dec. 16, 1929 |